United States Patent [19]

Okada et al.

[11] Patent Number: 4,738,515

[45] Date of Patent: Apr. 19, 1988

[54] DRIVING METHOD FOR LIQUID CRYSTAL DEVICE

[75] Inventors: Shinjiro Okada; Osamu Taniguchi, both of Kawasaki; Yutaka Inaba, Kawaguchi, all of Japan

[73] Assignee: Canon Kabushiki Kaisha, Tokyo, Japan

[21] Appl. No.: 891,584

[22] Filed: Aug. 1, 1986

[30] Foreign Application Priority Data

Aug. 5, 1985 [JP] Japan ................................ 60-172002

[51] Int. Cl.[4] ................................................ G02F 1/13

[52] U.S. Cl. ............................ 350/350 S; 350/339 R; 350/332

[58] Field of Search ................ 350/350 S, 332, 339 R; 340/784, 805, 811

[56] References Cited

U.S. PATENT DOCUMENTS

| | | | |
|---|---|---|---|
| 4,367,924 | 1/1983 | Clark et al. | 350/350 S |
| 4,388,375 | 6/1983 | Hopper et al. | 350/339 R |
| 4,411,496 | 10/1983 | Nonomura et al. | 350/332 |

FOREIGN PATENT DOCUMENTS

| | | | |
|---|---|---|---|
| 3502160 | 7/1985 | Fed. Rep. of Germany | 350/350 S |
| 0110218 | 8/1980 | Japan | 350/339 R |

*Primary Examiner*—Stanley D. Miller

*Assistant Examiner*—Huy V. Mai

*Attorney, Agent, or Firm*—Fitzpatrick, Cella, Harper & Scinto

[57] ABSTRACT

A driving method for a liquid crystal device of the type comprising arranged picture elements each comprising oppositely spaced electrodes, and a ferroelectric liquid crystal layer and a dielectric layer disposed between the electrodes, the ferroelectric liquid crystal layer having a resistance R(Ω) and a capacitance $C_1$(F), the dielectric layer having a capacitance $C_2$(F); wherein a driving voltage having a pulse duration ΔT(sec) set to satisfy the following formula (1) is applied to the picture elements:

Formula (1)

$$\exp\left(-\frac{\Delta T}{R(C_1+C_2)}\right) > (1-b+a)$$

wherein a is a coefficient satisfying the relationship of $a<|-Va|/|V_{ON}|$, $V_{ON}$ is a value of voltage (volt) applied to a picture element at the time of writing, $-Va$ is a value of voltage (volt) of a reverse polarity applied to the picture element after the application of the writing voltage $V_{ON}$, b is a coefficient defined by the equation of $b=|V_1|/|V_{ON}|$, and $V_1$ is the inversion initiation voltage (volts) of the liquid crystal layer.

24 Claims, 7 Drawing Sheets

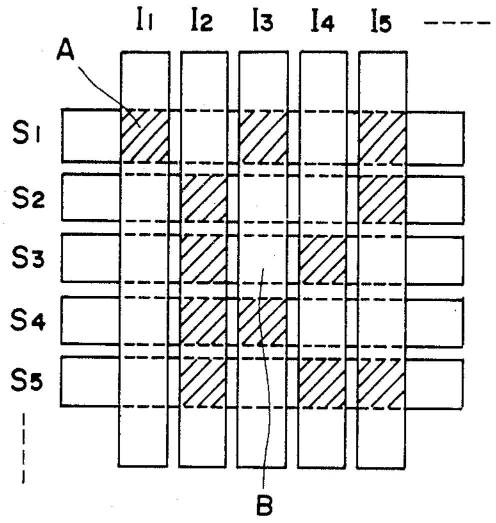
FIG. 5
FIG. 6A
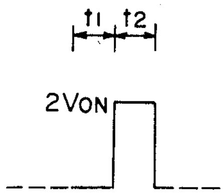
FIG. 6B
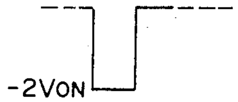

DRIVING METHOD FOR LIQUID CRYSTAL DEVICE

FIELD OF THE INVENTION AND RELATED ART

The present invention relates to a liquid crystal device, particularly a ferroelectric liquid crystal device.

Flat panel display devices have been extensively developed at present throughout the world. Among those, a display device using a liquid crystal (hereinafter sometimes abbreviated as "LC") is considered to have been well accepted commercially in the field of a small size display device, whereas it has been very difficult to provide a LC display device having a high resolution and a large picture area so that it can replace a CRT by using a conventional LC display system (e.g., TN or DSM system).

In order to obviate the above-mentioned drawbacks of the conventional types of LC devices, Clark and Lagerwall have proposed the use of a liquid crystal device having bistability (Japanese Laid-Open Pat. application No. 107216/1981, U.S. Pat. No. 4,367,924, etc.). As the bistable liquid crystal, a ferroelectric liquid crystal (hereinafter sometimes abbreviated as "FLC") having chiral smectic C (SmC*) phase or H (SmH*) phase is generally used. The FLC has bistability, i.e., has two stable states comprising a first stable state and a second stable state, with respect to an electric field applied thereto. Accordingly, different from the conventional TN-type LC in the above-mentioned device, the FLC is oriented to the first stable state in response to one electric field vector and to the second stable state in response to the other electric field vector. Further, this type of LC very quickly assumes either one of the above-mentioned two stable states in reply to an electric field applied thereto and retains the state in the absence of an electric field. By utilizing these properties, essential improvements can be attained with respect to the above-mentioned difficulties involved in the conventional TN-type LC devices.

As described in detail hereinafter, however, when a line-sequential writing scheme is applied to an FLC device as described above, a bias voltage of a polarity opposite to that of the signal voltage in the writing period is applied to the FLC at a particular picture element. When such a reverse polarity of bias voltage is continually applied to a picture element for more than a certain period, the writing state (e.g., "white") of the picture element is inverted to the other writing state (e.g., "black").

SUMMARY OF THE INVENTION

A principal object of the present invention is to provide a driving method for a liquid crystal having solved the above mentioned problem, particularly a driving method for an FLC (ferroelectric liquid crystal) device having solved a problem encountered when a line-sequential writing scheme is applied to an FLC device, i.e., having prevented an inversion or reversal phenomenon which can occur when a reverse polarity of voltage ($-aV_0+\Delta V_0$), an effective voltage applied to the LC layer at the instant of pulse switching as will be described hereinafter) is applied to a picture element which is in a display state obtained in the writing phase, in a phase subsequent to the writing phase.

According to the present invention, there is provided a driving method for a liquid crystal device of the type comprising arranged picture elements each comprising oppositely spaced electrodes, and a ferroelectric liquid crystal layer and a dielectric layer disposed between the electrodes, the ferroelectric liquid crystal layer having a resistance R(Ω) and a capacitance $C_1$(F), the dielectric layer having a capacitance $C_2$(F); wherein a driving voltage having a pulse duration ΔT(sec) set to satisfy the following formula (1) is applied to the picture elements:

$$\exp\left(-\frac{\Delta T}{R(C_1+C_2)}\right) > (1-b+a) \quad \text{Formula (1)}$$

wherein a is a coefficient satisfying the relationship of $a<|-Va|/|V_{ON}|$, $V_{ON}$ is a value of voltage (volt) applied to a picture element at the time of writing, $-Va$ is a volue of voltage (volt) of a reverse polarity applied to the picture element after the application of the writing voltage $V_{ON}$, b is a coefficient defined by the equation of $b=|V_1|/|V_{ON}|$, and $V_1$ is the inversion initiation voltage (volts) of the liquid crystal layer.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5 is a plan view illustrating matrix arrangement of picture elements formed by scanning lines ($S_1$–$S_5$) and data lines ($I_1$–$I_5$);

FIGS. 6A and 6B show another set of driving signals for writing in picture elements.

DETAILED DESCRIPTION OF PREFERRED EMBODIMENTS

The above mentioned FLC device which has been provided with a bistability condition, may generally be formed when the FLC layer is formed in an extremely thin thickness of 2 μm or less. Accordingly, there is a problem that a short circuit between an upper electrode and a lower electrode can occur through fine particles disposed in the device. For this reason, there is formed a dielectric layer for preventing the short circuit between opposite electrodes disposed in the device.

Because of the dielectric layer formed between the opposite electrodes as described above, however, when a sufficient amplitude of voltage $V_{ON}$ (writing pulse) for causing a complete inversion of the FL is applied from the electrodes to the LC layer, there occurs a voltage decrease of $\Delta V_0$ from $V_0$ (initially applied effective voltage) at the time of pulse application at a rate corresponding to a time constant $\pi = R_1(C_1 + C_2)$ with respect to an effective voltage applied to the LC layer, wherein $R_1$ is the resistance of the LC layer, $C_1$ is the capacitance of a unit area of the LC layer, and $C_2$ is the capacitance of a unit area of the dielectric layer. The voltage decrease $\Delta V_0$ increases as the resistance $R_1$ of the LC layer which is generally of the order of $10^8$ to $10^{14}\,\Omega$ for the above mentioned FLC layer. Our experiments have revealed that the voltage decrease $\Delta V_0$ is added as $-\Delta V_0$ at the time of pulse switching (phase $t_1 \rightarrow$ phase $t_2$) as will be described hereinafter and the voltage applied to the voltage applied at phase $t_2$ through the pulse switching has caused the inversion of a display state written in the phase $t_1$ (a first display state based on a first orientation state of an FLC) into another display state (a second display state based on a second orientation state of the FLC).

Figure 1A:
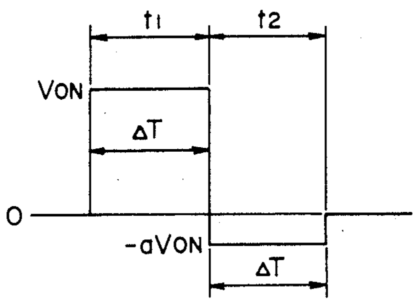
FIGS. 1A shows a rectangular driving pulse applied between electrodes.
Figure 1B:
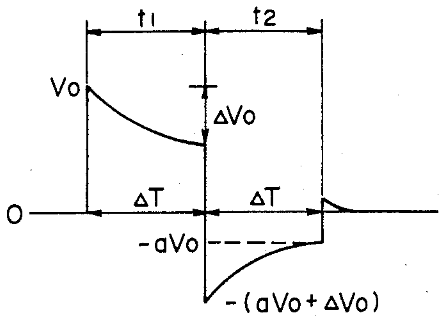
FIG. 1B shows a voltage waveform effectively applied to an LC layer at that time.

More specifically, in an example of a line-sequential writing scheme for an FLC device, a pulse for forming a first display state based on a first orientation state of an FLC is applied to all or a prescribed part of the picture elements at a first phase $t_1$, and a pulse for inverting the first display state into a second display state based on a second orientation state of the FLC is applied to selected picture elements at a subsequent phase $t_2$ as shown in FIG. 1A. At phase $t_2$ in this writing scheme, to the picture elements wherein the first display state is to be retained, a pulse having a polarity opposite to the pulse applied at phase $t_1$ and a level below a threshold value is applied at phase $t_2$ as shown in FIG. 1. Thus, in the line-sequential writing scheme, it is necessary that the display state written in the phase $t_1$ is retained without inversion in the phase $t_2$. Accordingly, a voltage exceeding the inversion threshold voltage should not be applied. As a result of our study, however, it has been revealed that a voltage of $-(a\ V_0 + \Delta V_0)$ (a is a value satisfying $a < |-Va|/|V_{ON}|$, and $-Va$ is a reverse polarity of bias voltage applied to a picture element to which a writing voltage $V_{ON}$ has been applied) is applied to the LC layer at the time of switching pulse polarities as shown in FIG. 1B, and when the voltage of $-(a\ V_0 + \Delta V_0)$ exceeds the inversion threshold voltage, a picture element which is expected to retain the first display state is inverted into the second display state, thus failing to provide a desired display. It has been also clarified that this problem is attributable to a reverse electric field ($-\Delta V_0$) generated by discharge from the capacitance of a dielectric layer serially connected to the LC layer at the time of switching between reverse polarities of pulses.

Further, to a picture element written in the first display state or the second display state at phases $t_1$ and $t_2$, an information signal is continually applied even in a scanning non-selection period so that the display state written in the picture element can be inverted on some occasion. In order to obviate this problem, it has been proposed to apply an alternating voltage not exceeding the threshold voltage to the picture elements after the writing. The application of the alternating voltage for this purpose also involves a problem similar to the one as described above accompanying the application of reverse polarity pulses to cause the addition of a reverse electric field.

Figure 2:
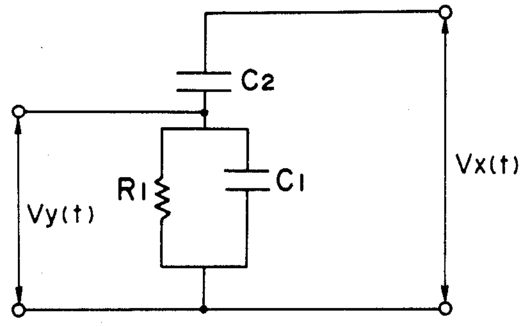
FIG. 2 shows an equivalent circuit of an LC device used in the present invention.

FIG. 2 shows an equivalent circuit of an LC device used in the present invention, wherein $C_1$ denotes the capacitance of an LC layer at on picture element, $C_2$ denotes the capacitance of a dielectric layer, and $R_1$ denotes the resistance of the liquid crystal layer. The capacitance $C_2$ is formed by dielectric layers such as an insulating layer, an orientation controlling film, a color filter, etc., as will be described hereinafter.

The following equation (2) represents an input rectangular pulse Vx (t) and the equation (3) represents an effective voltage Vy (t) applied to the LC layer.

$$Vx(t) = V_{ON}\{\mu(t) - \mu(t - \Delta T)\} \tag{2}$$

$$Vy(t) = \frac{C_2}{C_1 + C_2} \cdot V_{ON} \exp\left(-\frac{t}{R_1(C_1 + C_2)}\right) \cdot \left\{1 - \exp\left(\frac{\Delta T}{R_1(C_1 + C_2)}\right) \cdot \mu(t - \Delta T)\right\} \tag{3}$$

In the equations, $\mu(t)$ represents a step function, t represents a time, $\Delta t$ represents a pulse duration, $V_{ON}$ represents a voltage applied at the time of writing, and $R_1$, $C_1$ and $C_2$ are those defined above.

Figure 3A:
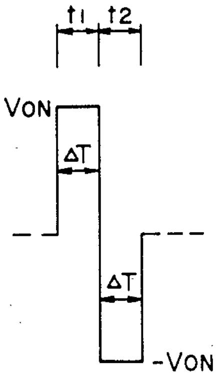
FIGS. 3A and 3B show driving signals for writing in picture elements.
Figure 3B:
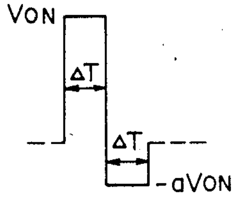
Figure 4:
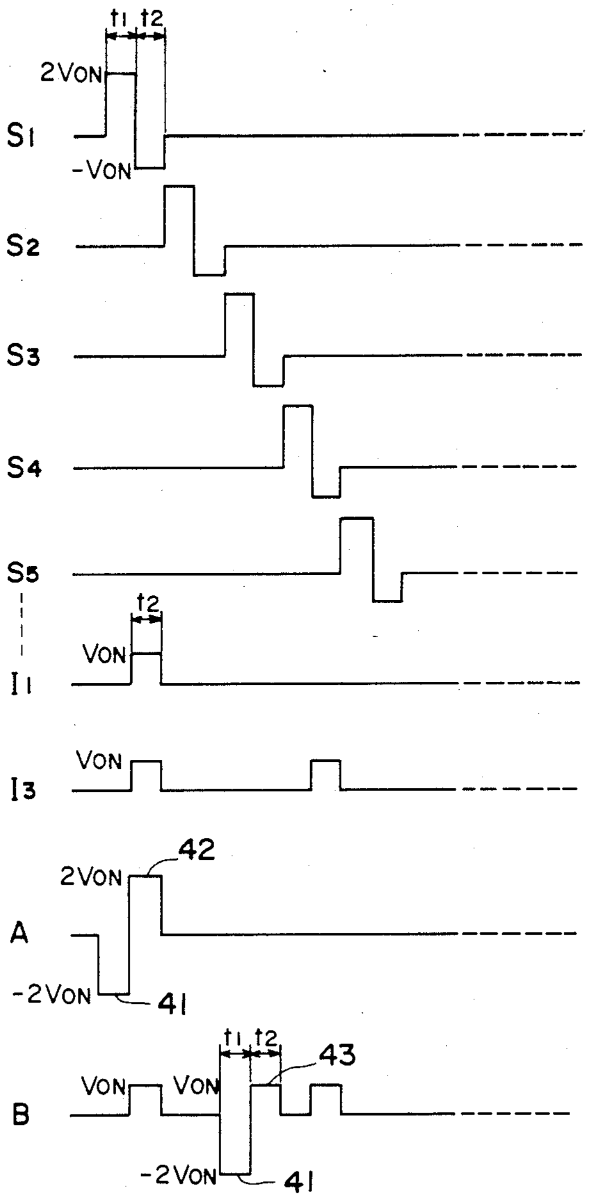
FIG. 4 shows time serial waveforms corresponding thereto.

As described before, when the line-sequential writing scheme is applied to the FLC device, writing into the first display state or the second display state is effected either at phase $t_1$ or at phase $t_2$ as shown in FIGS. 3A and 3B. FIGS. 3A and 3B show voltage waveforms of unit signal pulses applied to picture elements on a writing row or line in the line-seuqential writing scheme. More specifically, as shown in FIG. 3A, an FLC at a picture element on the row is oriented to the first orientation state by applying the voltage $V_{ON}$ between the opposite electrodes, whereby the picture element is brought to the first display state (assumed as "white"). Thus, the phase $t_1$ corresponds to a phase for applying a line-clear signal 41 shown in FIG. 4). Then, as shown in FIG. 3B, a second display state (assumes as "black") is formed by inversion at selected picture elements in phase $t_2$. More specifically, in the phase $t_2$, an inversion signal 42 is applied to the selected picture elements, and a holding signal 43 for retaining the display state obtained in the phase $t_1$ to the remaining picture elements. In this instance, the holding signal 43 in the phase $t_2$ as a voltage $aV_0$ which has a polarity opposite to that of the signal applied at the writing step in the phase $t_1$ is applied, whereby the problem accompanying the pulse switching between opposite polarities is encountered. Incidentally, FIG. 4 shows time serial waveforms comprising unit signal pulses as shown in FIGS. 3A and 3B applied to matrix picture elements as shown in FIG. 5, wherein FIG. 4 shows an example in which the above mentioned coefficient a is $\frac{1}{2}$).

FIGS. 6 shows unit pulse voltage waveforms applied to picture elements on a writing row or line in another line-sequential writing scheme. More specifically, FIG. 6A shows a voltave waveform for writing "black" at a picture element in phase $t_2$, and FIG. 6B shows a voltage waveform for writing "white" at a picture element in phase $t_1$. Thus, the phase $t_1$ is a white-writing phase and the phase $t_2$ is a black-writing phase.

Figure 7:
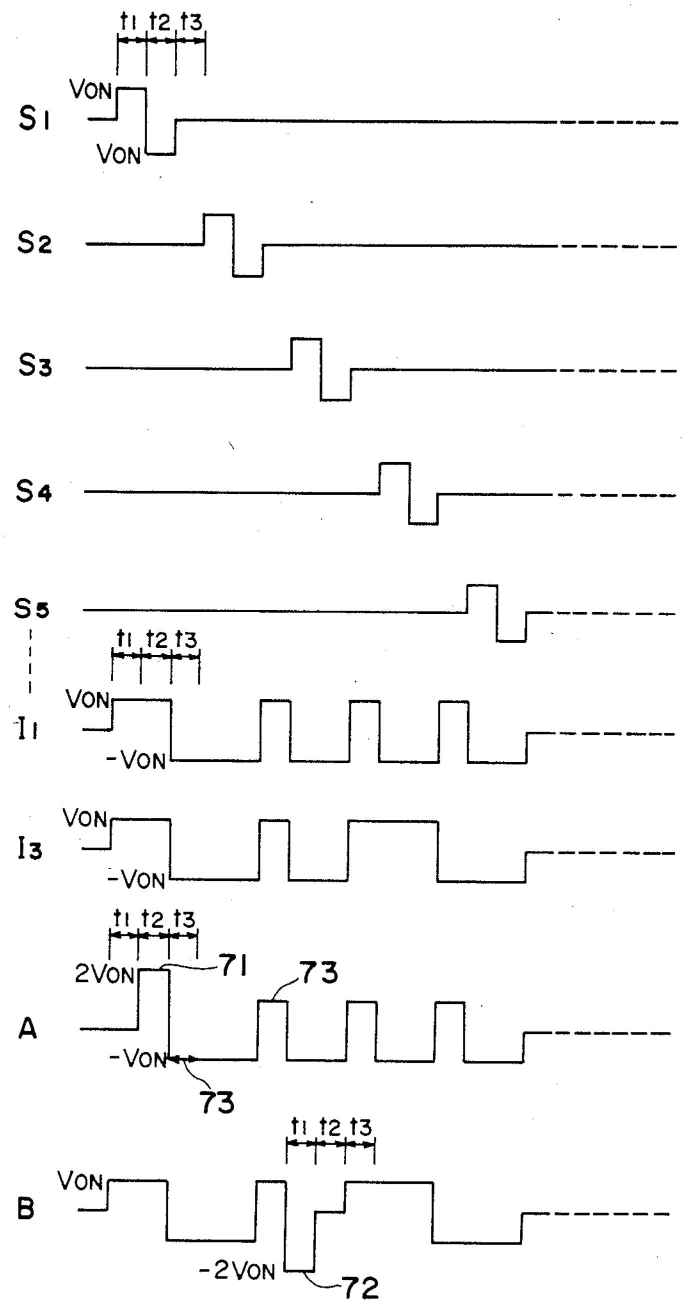
FIG. 7 shows time serial waveforms corresponding thereto.

In a preferred embodiment according to the writing scheme explained with reference to FIGS. 6A and 6B, an auxiliary signal 73 may be applied at phase $t_3$ to a driving signal applied to a picture element, so that a signal of a polarity opposite to that of the writing signal is not continually applied to the picture element. This embodiment is explained with reference to FIG. 7. As shown in FIG. 7, after a black-writing signal 71 is applied to a picture element at phase $t_2$, an auxiliary signal 73 is applied to the picture element at phase $t_3$, so that a continually applied signal of an opposite polarity is not formed. Incidentally, FIG. 7 shows a driving example wherein a is $\frac{1}{2}$, i.e., the pulse height of the auxiliary signal 73 is made $\frac{1}{2}$ of that of the writing signal. Generally, the coefficient a is set to satisfy the relationship of $a \leqq \frac{1}{3}$.

As a result, as shown in FIG. 7, the auxiliary signal 73 is applied to a picture element in a polarity opposite to that of the black-writing signal 71. Thus, a problem similar to that explained with reference to FIGS. 3 and 4 as described above is encountered.

Figure 8:
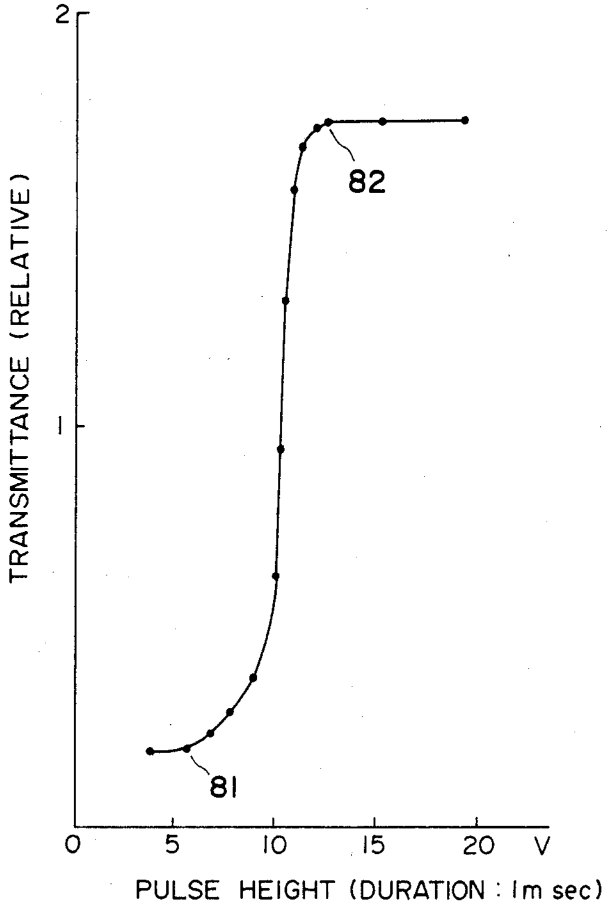
FIG. 8 is a view for illustrating a relationship between an inversion initiation voltage and a complete inversion voltage.

Our experiments have revealed that when such a line-sequential writing scheme is applied to an FLC showing a transmittance-applied voltage characteristic curve as shown in FIG. 8, the inversion initiation voltage $V_1$ shown at 81 on the curve is present in the range of from $5/6 \cdot V_{ON}$ to $V_{ON}$ (i.e., b=5/6 to 1 when $V_1$ is denoted by $bV_{ON}$). Accordingly, the reverse polarity voltage should be set below $bV_{ON}$ $(=5/6 \cdot V_{ON})$. Thus, the following formula (4) holds.

$$aV_{ON} + \left\{ 1 - \exp\left( - \frac{\Delta T}{R_1(C_1 + C_2)} \right) \right\} \cdot V_{ON} < bV_{ON} = \frac{5}{6} V_{ON} \qquad (4)$$

From the above formula (4), the following formula (1) may be derived.

$$\exp\left( - \frac{\Delta T}{R_1(C_1 + C_2)} \right) > (1 - b + a) = \left( \frac{1}{6} + a \right) \qquad (1)$$

Then, in a case of $a = \frac{1}{3}$, the following formula (5) is obtained from the above formula (1):

$$\Delta T < R_1(C_1 + C_2) \times 0.7 \qquad (5)$$

In a case where a 1.8 μm-thick DOBABC layer was used as an FLC layer constituting picture elements and a 1000 Å-thick polyimide film was provided respectively on the upper and lower electrodes, the capacitance $C_1$ of the LC layer per 1 $mm^2$ (assumed to constitute one picture element) was 11 pF, the capacitance $C_2$ of the dielectric layers was 170 pF per 1 $mm^2$, and the resistance of the 1.8 μm-thick LC layer was $1.8 \times 10^9$. Then these values are substituted in the formula (5), the pulse duration $\Delta T$ should satisfy the following formula (6):

$$\Delta T < 1.8 \times 10^9 \times 181 \times 10^{-12} \times 0.7 \approx 228 \times 10^{-3} \text{ (sec)}. \qquad (6)$$

As a result, if the pulse duration $\Delta T$ is set to below 228 msec in the above mentioned example, the driving voltage applied to the LC layer does not exceed the inversion initiation voltage $V_1$ $(=5/6\ V_{ON})$, so that a desired display picture may be formed by applying the line-sequential writing scheme.

Figure 12:
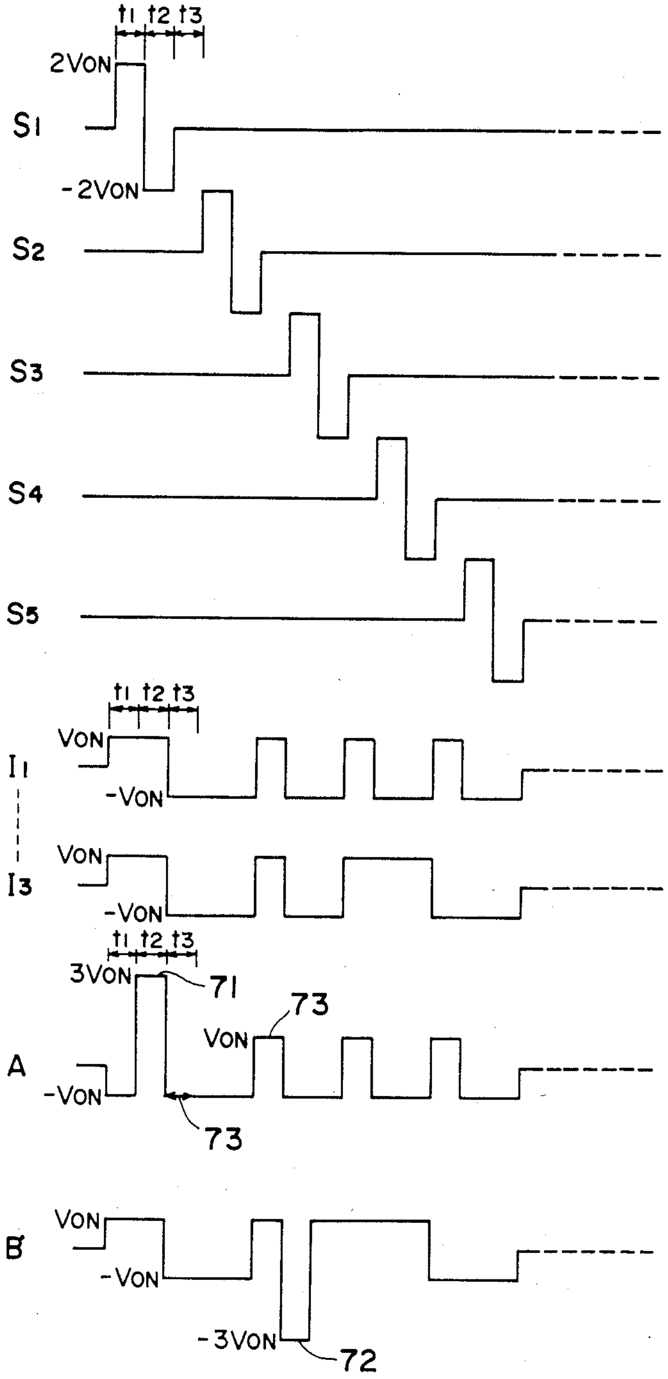
FIG. 12 show another set of time serial waveforms used in another driving example according to the present invention.

FIG. 12 shows another example of driving, wherein a is $\frac{1}{3}$ instead of $\frac{1}{2}$ as used in the driving example shown in FIG. 7.

The inversion initiation voltage 81 shown in FIG. 8 corresponds to a threshold for yielding an inverted domain in one picture element, and the complete inversion voltage 82 corresponds to a saturation voltage whereby one picture element is completely occupied by the inverted domain.

In the above mentioned examples, rectangular pulses are used as driving pulses, but other pulse waveforms such as triangular waves may also be used without being restricted to the rectangular pulses.

Hereinbelow, some features of an FLC device or cell are supplemented.

Figure 9:
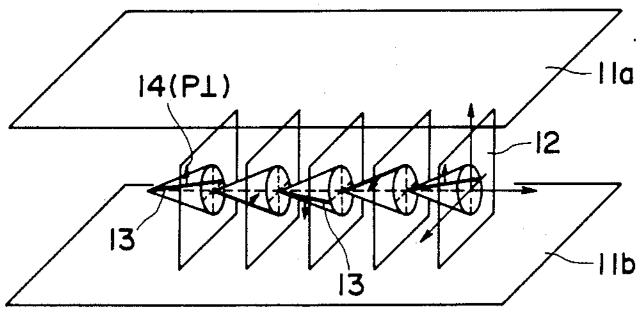
FIGS. 9 and 10 are schematic perspective views for illustrating FLC devices used in the driving method according to the present invention.

Referring to FIG. 9, there is schematically shown an example of an FLC cell. Reference numerals 11a and 11b denote substrates (glass plates) on which a transparent electrode of, e.g., $In_2O_3$, $SnO_2$, ITO (Indium-Tin-Oxide), etc., is disposed, respectively. A liquid crystal of an SmC*-phase in which LC molecular layers 12 are oriented perpendicular to surfaces of the glass plates is hermetically disposed therebetween. A full line 13 shows LC molecules. Each LC molecule 13 has a dipole moment ($P\perp$) 14 in a direction perpendicular to the axis thereof. When a voltage higher than a certain threshold level is applied between electrodes formed on the base plates 11a and 11b, a helical or spiral structure of the LC molecules 13 is loosened or released to change the alignment direction of respective LC molecules 13 so that the dipole moment ($P\perp$) 14 are all directed in the direction of the electric field. The LC molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the LC cell thus arranged functions as an LC optical modulation device of which optical characteristics vary depending upon the polarity of an applied voltage. Further, when the thickness of the LC cell Eb of which direction is opposite to that of the electric field Ea is applied thereto, the LC molecules are oriented to the second orientation state 23b, whereby the directions of molecules are changed. Likewise, the latter state is stably retained even if the electric field is removed. Further, as long as the magnitude of the electric field Ea or Eb being applied is not above a certain threshold value, the LC molecules are retained in the respective orientation states. In order to effectively realize high response speed and bistability, it is preferable that the thickness of the cell is as thin as possible and generally 0.5 to 20 μ, particularly 1 to 5 μ. An LC electrooptical device having a matrix electrode structure in which the FLC of this kind is used is proposed, e.g., in the specification of U.S. Pat. No. 4,367,924 by Clark and Lagerwall.

Figure 11:
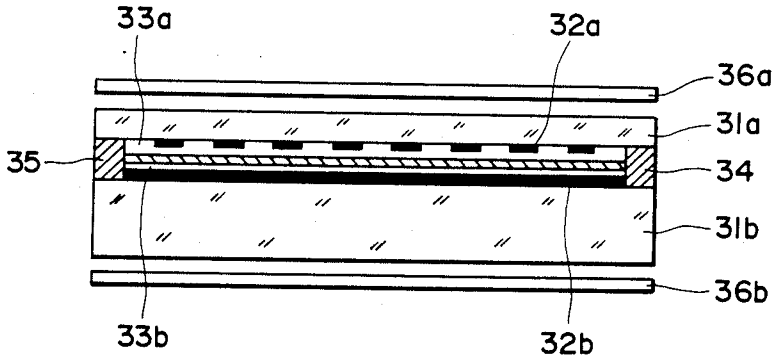
FIG. 11 is a sectional view showing an FLC device used in the driving method according to the present invention.

FIG. 11 shows a sectional view of an LC device according to the present invention. The liquid crystal device comprises substrates 31a and 31b on which mutually opposite electrodes 32a and 32b are disposed.

Further, the electrodes 32*a* and 32*b* are coated with dielectric layers 33*a* and 33*b* for preventing short circuit therebetween. The dielectric layers 33*a* and 33*b* have been subjected to a uniaxial orientation treatment such as rubbing for controlling the orientation or alignmeht of an FLC layer 34. Further, another orientation controlling film (not shown) can be disposed on the dielectric layers 33*a* and 33*b*. Further, it is possible to dispose a color filter layer (not shown) on or below either one of the dielectric layers. An example of such a color filter may comprise a blue dyed filter (B), a green dyed filter (G) and a red dyed filter (R) disposed for each picture element so that the B, G and R filters in combination form one color picture element. In the LC device, the substrates 31*a* and 31*b* are secured to each other by a sealing member 35 such as an epoxy adhesive, and on both sides of the cell, a pair of polarizers 36*a* and 36*b* are disposed in cross nicols so as to detect the optical modulation by the LC 34.

The dielectric layers 33*a* and 33*b* may be formed of any insulating material without particular restriction. Examples of the insulating material used for this purpose may include inorganic insulating materials such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, and magnesium fluoride; and organic insulating materials such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin, acrylic resin and photoresist resins. These insulating materials may be formed into a film in a thickness of generally 5000 Å or less, preferably 100–5000 Å, particularly suitably 500–3000 Å.

By adjusting the capacitance of the dielectric layers 33*a* and 33*b* to $5.5\times10^3$ pF/cm$^2$ or above, the above mentioned inversion or reversal phenomenon may be further effectively prevented. The capacitance may preferably be in the range of $5.5\times10^3$ pF/cm$^2$ to $3.0\times10^5$ pF/cm$^2$, and particularly suitably be in the range of $9.0\times10^3$ pF/cm$^2$ to $5.5\times10^4$ pF/cm$^2$.

The FLC 34 used in the present invention is most preferably a chiral smectic liquid crystal, among which one in chiral smectic C phase (SmC*), H phase (SmH*), I phase (SmI*), J phase (SmJ*), K phase (SmK*), G phase (SmG*) or F phase (SmF*) is most suited.

More specifically, examples of the ferroelectric liquid crystal 34 include p-decyloxybenzylidene-p'-amino-2-methylbutylcinnamate (DOBAMBC), p-hexyloxybenzylidene-p'-amino-2-chloropropylcinnamate (HOBACPC), p-decyloxybenzylidene-p'-amino-2-methylbutyl-α-cyanocinnamate (DOBAMBCC), p-tetradecyloxybenzylidene-p'-amino-2-methylbutyl-α-cyanocinnamate (TDOBAMBCC), p-octyloxybenzylidene-p'-amino-2-methylbutyl-α-chlorocinnamate (OOBAMBCC), p-octyloxybenzylidene-p'-amino-2-methylbutyl-α-methylcinnamate, 4,4'-azoxycinnamic acid-bis(2-methylbutyl) ester, 4-o-(2-methyl)butylresorcylidene-4'-octylaniline (MBRA 8), 4-(2'-methylbutyl)phenyl-4'-octyloxybiphenyl-4-carboxylate, 4-hexyloxyphenyl-4-(2''-methylbutyl) biphenyl-4'-carboxylate, 4-octyloxyphenyl-4-(2''-methylbiphenyl)-4'-carboxylate, 4-heptylphenyl-4-(4''-methylhexyl)biphenyl-4'-carboxylate, and 4-(2''-methylbutyl)phenyl-4-(4''-methylhexyl) biphenyl-4'-carboxylate. These FLC compounds may be used singly or in combination of two or more thereof. Further, another non ferroelectric liquid crystal such as nematic liquid crystal, cholesteric liquid crystal or smectic liquid crystal may be mixed with these compounds as far as the resultant mixture shows a ferroelectricity.

Figure 10:
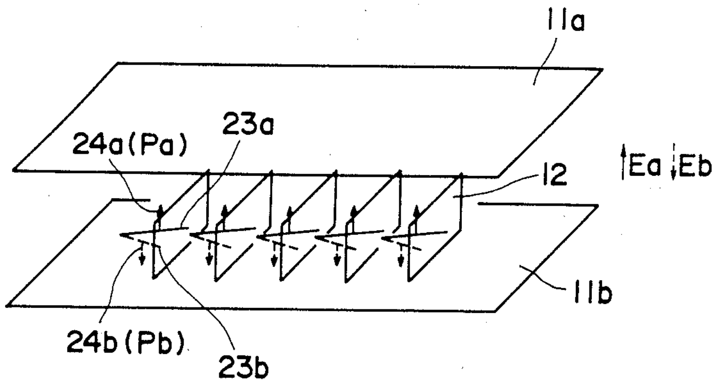

The FLC 34 may be in a spiral structure as shown in FIG. 9, or may be in a non-spiral structure as shown in FIG. 10. When the FLC has structure as shown in FIG. 9, it is preferred to use a driving method wherein an FLC having a negative dielectric anisotropy is used and an AC bias is applied between the opposite electrodes to form a non-spiral structure providing bistability. Further it is also possible to use a driving method wherein an LC device having a thickness small enough to provide a non-spiral structure by itself is supplied with the above mentioned AC bias.

As described above, according to the present invention, a desired display may be accomplished by applying the row or line-sequential writing scheme and retaining the writing states for a period of one frame in spite of the presence of a reverse electric field ($-\Delta V_0$) caused by discharge from the capacitance of a dielectric layer generated at the time of pulse switching between opposite polarities.

What is claimed is:

1. A driving method for a liquid crystal device of the type comprising arranged picture elements each comprising oppositely spaced electrodes, and a ferroelectric liquid crystal layer and a dielectric layer disposed between the electrodes, said ferroelectric liquid crystal layer having a resistance R(Ω) and a capacitance $C_1$(F), said dielectric layer having a capacitance $C_2$(F); wherein a driving voltage having a pulse duration ΔT(sec) set to satisfy the following formula (1) is applied to the picture elements:

Formula (1)

$$\exp\left(-\frac{\Delta T}{R(C_1+C_2)}\right) > (1-b+a)$$

wherein a is a coefficient satisfying the relationship of $a<|-Va|/|V_{ON}|$, $V_{ON}$ is a value of voltage (volt) applied to a picture element at the time of writing, $-Va$ is a value of voltage (volt) of a reverse polarity applied to the picture element after the application of the writing voltage $V_{ON}$, b is a coefficient defined by the equation of $b=|V_1|/|V_{ON}|$, and $V_1$ is the inversion initiation voltage (volts) of the liquid crystal layer.

2. A driving method according to claim 1, wherein said ferroelectric liquid crystal is formed in a bistability condition.

3. A driving method according to claim 1, wherein said ferroelectric liquid crystal has a resistance in the range of $10^8$ to $10_{14}$ Ω.

4. A driving method according to claim 1, wherein said dielectric layer has a capacitance of $5.5\times10^3$ pF/cm$_2$ or above.

5. A driving method according to claim 1, wherein said dielectric layer has a capacitance in the range of $5.5\times10^3$ pF/cm$^2$ to $3.0\times10^5$ pF/cm$^2$.

6. A driving method according to claim 1, wherein said dielectric layer has a capacitance of $9\times10^3$ pb/cm$^2$ to $5.5\times10^4$ pF/cm$^2$.

7. A driving method according to claim 1, wherein said picture elements are arranged in a plurality of rows and columns, a driving voltage for providing a first display state based on a first orientation state of the ferroelectric liquid crystal is applied row by row and sequentially to all or a part of the picture elements on a row in a first phase, and a driving voltage for providing a second display state based on a second orientation state of the ferroelectric liquid crystal is applied to selected picture elements on the row in a second phase.

8. A driving method according to claim 7, which includes a third phase for applying an auxiliary signal.

9. A driving method according to claim 1, wherein said picture elements are arranged in a plurality of rows and columns, a driving voltage for providing a first display state based on a first orientation state of the ferroelectric liquid crystal is applied row by row and sequentially to selected picture elements on a row in a first phase, and a driving voltage for providing a second display state based on a second orientation state of the ferroelectric liquid crystal is applied to other selected picture elements on the row in a second phase.

10. A driving method according to claim 9, which includes a third phase for applying an auxiliary signal.

11. A driving method according to claim 1, wherein said ferroelectric liquid crystal is placed under a bistability condition.

12. A driving method according to claim 1, wherein said ferroelectric liquid crystal is a chiral smectic liquid crystal.

13. A driving method according to claim 12, wherein said chiral smectic liquid crystal is in chiral smectic C phase, H phase, I phase, J phase, K phase, G phase or F phase.

14. A driving method according to claim 1, wherein said coefficient a is $\frac{1}{2}$ or less.

15. A driving method according to claim 1, wherein said coefficient a is $\frac{1}{3}$ or less.

16. A driving method according to claim 1, wherein said coefficient b is in the range of 5/6 to 1.

17. A driving method according to claim 1, wherein said dielectric layer has been subjected to a uniaxial orientation treatment.

18. A driving method according to claim 17, wherein said uniaxial orientation treatment is rubbing.

19. A driving method according to claim 1, wherein said dielectric layer is a laminate of at least two dielectric layers, the upper one of which has been subjected to a uniaxial orientation treatment.

20. A driving method according to claim 19, wherein said uniaxial orientation treatment is rubbing.

21. A driving method according to claim 1, wherein said dielectric layer is a color filter layer.

22. A driving method according to claim 1, wherein said dielectric layer is a laminate of at least two dielectric layers, of which a lower dielectric layer is a color filter layer and the upper layer has been subjected to a uniaxial orientation treatment.

23. A driving method according to claim 22, wherein said uniaxial orientation treatment is rubbing.

24. A driving method according to claim 1, wherein said dielectric layer is a film of an inorganic insulating material or an organic insulating material.

* * * * *

UNITED STATES PATENT AND TRADEMARK OFFICE
CERTIFICATE OF CORRECTION

PATENT NO. : 4,738,515
DATED : April 19, 1988
INVENTOR(S) : Shinjiro OKADA ET AL.

It is certified that error appears in the above-identified patent and that said Letters Patent is hereby corrected as shown below:

COLUMN 1 line 56, "above mentioned" should read --above-mentioned--; and line 63, "switching as" should read--switching (as--.

COLUMN 2 line 18, "volue" should read --value--;

line 54, "show" should read --shows--; and line 60, "above mentioned" should read --above-mentioned--.

COLUMN 3 line 4, "FL" should read --FLC--; and line 15, "above mentioned" should read --above-mentioned--.

UNITED STATES PATENT AND TRADEMARK OFFICE
CERTIFICATE OF CORRECTION

PATENT NO. : 4,738,515
DATED : April 19, 1988
INVENTOR(S) : Shinjiro OKADA ET AL.

It is certified that error appears in the above-identified patent and that said Letters Patent is hereby corrected as shown below:

COLUMN 4 line 5, "on" should read --one--;

line 25, "$\triangle$t represents" should read --$\triangle$T represents--;

line 34, "line-seuqential" should read --line-sequential--;

line 40, "FIG. 4)." should read --FIG. 4.--;

line 41, "(assumes" should read --(assumed--;

line 57, "above" should read --above- --;

line 58, "1/2)" should read --1/2.--; and line 62, "voltave" should read --voltage--.

UNITED STATES PATENT AND TRADEMARK OFFICE
CERTIFICATE OF CORRECTION

PATENT NO. : 4,738,515

DATED : April 19, 1988

INVENTOR(S) : Shinjiro OKADA ET AL.

It is certified that error appears in the above-identified patent and that said Letters Patent is hereby corrected as shown below:

COLUMN 5 line 60, "1.8 x $10^9$." should read --1.8 x $10^9 \Omega$ --;

line 61, "Then" should read --When--

COLUMN 6 line 2, "above mentioned" should read --above-mentioned--;

line 16, "above mentioned" should read --above-mentioned--; and line 37, "moment" should read --moments--.

COLUMN 7 line 5, "alignmeht" should read --alignment--;

line 39, "above" should read --above- --.

COLUMN 8 line 2, "non ferroelectric" should read --non-ferroelectric--;

UNITED STATES PATENT AND TRADEMARK OFFICE
CERTIFICATE OF CORRECTION

PATENT NO. : 4,738,515

DATED : April 19, 1988

INVENTOR(S) : Shinjiro OKADA ET AL.

It is certified that error appears in the above-identified patent and that said Letters Patent is hereby corrected as shown below:

COLUMN 8 line 17, "above mentioned" should read --above-mentioned--;

line 56, "$10^8$ to $10_{14}\Omega$" should read --$10^8$ to $10^{14}\Omega$--;

line 59, "$pF/cm_2$" should read --$pF/cm^2$--.; and line 64, "$9 \times 10^3$ $pb/cm^2$" should read --$9 \times 10^3$ $pF/cm^2$"--.

Signed and Sealed this

Twenty-second Day of November, 1988

*Attest:*

DONALD J. QUIGG

*Attesting Officer*

*Commissioner of Patents and Trademarks*